April 7, 1959  F. S. CRAIG  2,881,420
GLASS INSERT RETAINER FOR LIGHT SIGNAL SPECTACLES
Filed Feb. 13, 1956
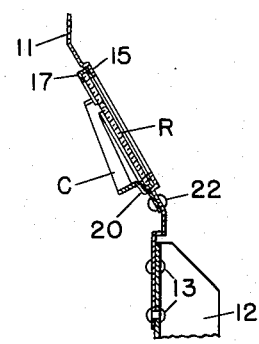
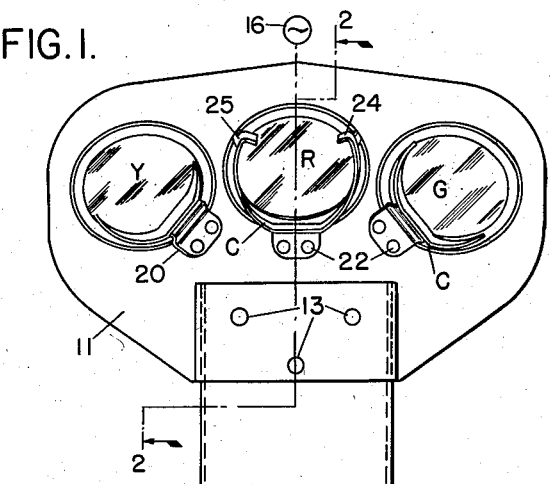
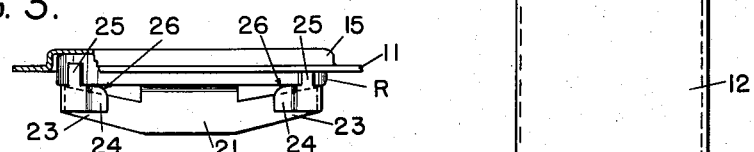
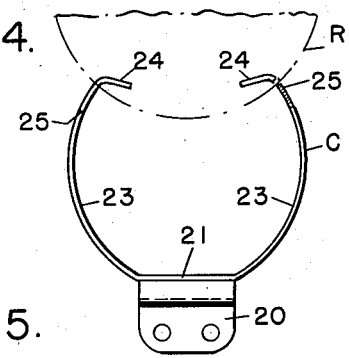
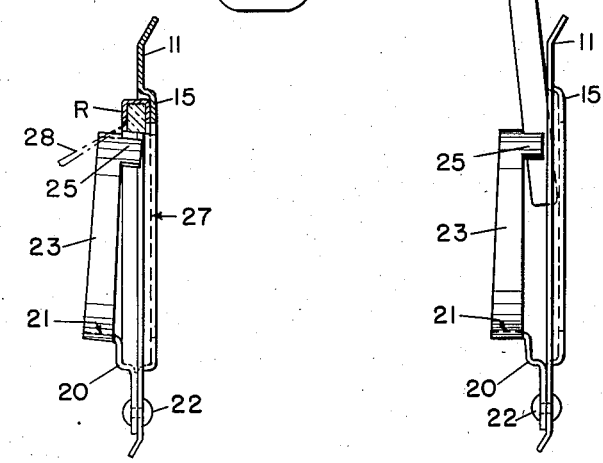
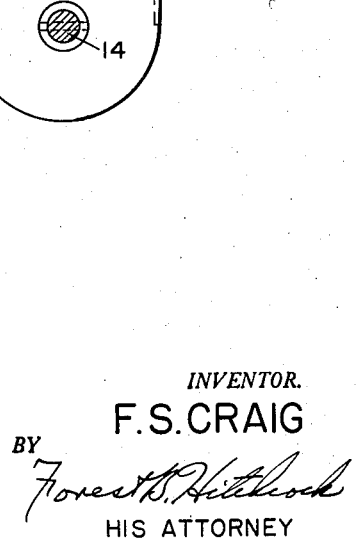
*INVENTOR.*
F. S. CRAIG
BY Forest D. Hitchcock
HIS ATTORNEY

United States Patent Office 2,881,420
Patented Apr. 7, 1959

2,881,420

GLASS INSERT RETAINER FOR LIGHT SIGNAL SPECTACLES

Frank S. Craig, Chili, N.Y., assignor to General Railway Signal Company, Rochester, N.Y.

Application February 13, 1956, Serial No. 565,067

6 Claims. (Cl. 340—383)

This invention relates in general to multiple aspect spectacles for light signals and more particularly to a retaining means for holding the color glass discs in position on the spectacle in a manner whereby they may be quickly and conveniently inserted and removed.

In light signals of this type, quite commonly used in railway signaling practice, the spectacle arm carries various colored glass discs and is adapted to rotate in either direction through a light-beam source so that different colored signal aspects can be displayed in accordance with the movement of the spectacle arm.

During actual service, these glass discs may be burned and become discolored or they may be cracked by the heat caused by the pinpoint focus of the lightbeam, or it may be desirable to change a color aspect, all of which necessitates having them removed and replaced. As a mechanism of this type must of necessity be quite compact and the spectacle must be positioned to be moved between a light source and a spreadlight lens, a glass disc retaining means which would permit interchangeability without disassembly of the mechanism is very desirable.

In past practice each glass disc was positioned by means of at least three individual or two or more double spring biased clips evenly spaced around the perimeter of the glass disc, each clip being riveted or screw fastened to the spectacle. Removal of a glass disc required either removal or displacement of two of the clips, a very difficult operation in the assembled position of the mechanism. The present invention contemplates the use of a single two-way spring biased clip having a three-point holding means which permits easy insertion or removal of the glass discs into and out of their assembled positions on the spectacle.

The retaining means of the present invention comprises a retaining clip preferably made from spring bronze material. The clip is of general horseshoe shape, the toe end comprising one of the three holding points and having an angle portion integral therewith to facilitate fastening to the spectacle. The two open ends of the clip also comprise holding points and have additional lug members which prevent side movement and center the glass disc when in position. The two open ends may be spread apart against normal spring bias to permit insertion or removal of the glass disc whereas the toe end provides a hinge action whereby the clip may be sprung outward away from the spectacle against normal spring bias to allow clearance for insertion or removal of the glass disc.

The main object of the present invention is the provision of a spring biased single retaining clip member capable of providing a three-point holding means for holding a spectacle glass disc on a spectacle frame wherein the equivalent of permanent mounting is provided while at the same time quick and easy interchangeability of the glass disc can be accomplished.

In describing the invention in detail, reference will be made to the accompanying drawings wherein like reference characters refer to like parts and in which:

Fig. 1 is a front view of a typical light signal spectacle arm mounted for rotary movement and shows an arrangement for mounting three-color glass discs by means of retaining clips constructed in accordance with the present invention;

Fig. 2 is a sectional side view taken on the line 2—2 of Fig. 1 as viewed in the direction of the arrows and shows a retaining clip holding a glass disc in its mounted position on the spectacle arm;

Fig. 3 is an enlarged top view of the apparatus shown in Fig. 2;

Fig. 4 is an enlarged front view of a retaining clip member constructed in accordance with the present invention;

Fig. 5 is an enlarged side view similar to the Fig. 2 sectional view and shows a retaining clip holding a glass disc in its mounted position on the spectacle arm; and Fig. 6 is an enlarged side view similar to Fig. 5 except it shows a glass disc in a position wherein it is in the process of being inserted into its mounting.

Referring now more particularly to Figs. 1 and 2 of the drawings, the spectacle arm comprises in general a spectacle frame 11 and a supporting arm 12 which are fastened together by rivets 13. In regular practice, this spectacle arm may be rotary operated in any well-known manner, such as for example by electroresponsive devices as disclosed in the pending application of R. W. Hewes, Ser. No. 413,527, filed March 2, 1954, now Patent No. 2,750,577, dated June 12, 1956, or motor operated as disclosed in the patent to O. S. Field, No. 2,239,316, dated April 22, 1941. In the present disclosure, for the sake of simplicity, the spectacle arm has been shown pinned to a shaft 14, this shaft 14 providing the mounting means as well as the operating means.

The spectacle frame 11 is provided with three countersunk openings 15 which are of a slightly larger diameter than the colored glass discs Y, R and G, designated as such to indicate the colors yellow, red and green. These openings 15 are located side by side in an arcuate manner so that the red glass disc R is in the center position directly in line with the signal light source 16, this center position being the normal biased danger indication position of the spectacle arm. It can be seen that a clockwise movement of the spectacle arm will position the yellow glass disc Y in line with the light source 16 so that the signal will display a caution indication, whereas a counterclockwise movement of the spectacle arm will position the green glass disc G in line with the light source 16, causing the signal to display a clear indication. Suitable stops (not shown) limit the movement of the spectacle arm.

The colored glass discs Y, R and G are each mounted in a metallic frame 17 to facilitate mounting and also to prevent breakage due to handling and use. As previously mentioned, the retaining means provided for mounting the glass discs comprises a horseshoe shaped clip C made of spring bronze material or the like. This clip C is formed to such a size that normally it is somewhat smaller than the diameter of the glass discs Y, R and G. The clip C is provided with an angle bracket portion 20 at its toe end section 21 to facilitate mounting to the spectacle, as by rivets 22. Each of the arcuate arms 23 of the clip C is provided with a turned in lug portion or finger 24 at its extreme end and also a projecting lug or finger 25 located on its inner side near its extreme end, as shown more clearly in Figs. 1, 3 and 4. The lug portions 24 have their inner corners rounded off as shown at 26 to facilitate mounting the color discs as will be explained hereinafter.

Referring now more particularly to Figs. 3, 4 and 6, the glass discs, as for example, the glass disc R, are inserted into position between the retaining clip C and the countersunk spectacle opening 15 by first inserting the tip of the glass disc R into the opening defined by the lugs 24—25 of the clip C and the face of the spectacle 11, as indicated by the dot and dash line in Fig. 4 and shown in full in Fig. 6, the glass disc R entering the opening at a slight angle. The glass disc R may now be forced into position, the disc entering between the two lugs 25 and forcing the two arm sections 23 apart against their natural spring bias. At the same time, the width of the glass disc R will force the complete clip C outward against its natural spring bias, it being anchored only at its toe end section 21 (see Fig. 4).

As soon as the center portion of the glass disc R passes beyond the lugs 25, the two arm portions 23 will start closing in due to their natural spring bias, and the glass disc R will now slip quickly into position with its lower edge resting against the angle bracket portion 20 of the toe end section 21. The glass disc R now will lie wholly within the countersunk opening 15, the outward pressure against the natural bias of the clip C being relieved so that it will press inward against the glass disc R and hold it within the confines of the countersunk opening 15, the two lugs 24 and the angle bracket portion 20 forming a three point holding means so far as inward forces are concerned. The two lugs 25 will now have their tips inside the countersunk opening 15 and will be bearing against the sides of the glass disc R at a point above center, thus clamping the disc in position and applying a force directed toward the center and bottom of the disc. The diameter of the countersunk opening 15 is slightly larger than the diameter of the glass disc R to facilitate assembly and allow for manufacturing tolerances. The tips of the lugs 25 extending into the countersunk opening 15 between the sides of the opening and the glass disc frame 17 act as spacers to center up the glass disc R and also prevent any movement of the glass disc due to vibrations and such.

Removal of the glass disc R from its mounted position may be accomplished in two ways. Where clearance in housings are no problem, the glass disc R may be removed merely by first applying pressure with a finger on the back side thereof as indicated at 27 in Fig. 5. This will force the glass disc R outward out of its confining countersunk opening 15, causing the retaining clip C to bend at the angle bracket portion 20, the arm portions 23 and their associated lugs 25 moving outward. As soon as the glass disc R and the lugs 25 are free from the countersunk opening 15, the glass disc R may be slid upward between the two lugs 25, the arm portions 23 spreading apart as previously described, to allow passage between the two lugs 25. In cases where the spectacle arm is assembled in a signal mechanism housing as shown in the previously mentioned patents, wherein the clearances do not permit getting behind the glass disc R, it may be removed by inserting a sharp tool, such as the point of a knife blade or the like, under the edge of the glass disc frame 17, as indicated by the dot and dash lines 28 (see Fig. 5). With the tool in position as shown, the glass disc R may be pried outward, springing the arm portions 23 of the retaining clip C outward until the glass disc R and the tips of the lugs 25 are free from the countersunk opening 15, whereupon the glass disc R may be slipped upward as previously described.

From the foregoing description and with reference to the drawing illustrations, it should be clear that a one piece spectacle glass retaining clip constructed in accordance with the present invention is far superior to, and has many advantages over, the ordinary practice of using multiple clips, clamps, brackets, etc. Simplicity of operation, manufacture and assembly all contribute to its merits and reduce production costs.

Having shown and described one form which the invention can assume, it should be understood that other adaptations and forms could be made without departing from the spirit of the present invention or the scope of the appending claims.

What I claim is:

1. A structure for mounting a glass disc on a spectacle frame comprising a countersunk flanged opening in said spectacle frame, a glass disc adapted for insertion in said spectacle frame flanged opening, a retaining clip of resilient material permanently mounted on said spectacle frame in a position directly adjacent to said spectacle frame flanged opening, said retaining clip having a base portion and two opposed arm portions each having a two-way spring bias in relation to each other and to said spectacle frame in a manner whereby said two arm portions are spring biased towards each other and also spring biased towards said spectacle frame, said retaining clip permitting insertion and removal of said glass disc in opposition to said two way spring bias, said two way spring bias providing the force necessary to permit said retaining clip to hold said glass disc in position in said spectacle frame flanged opening.

2. A structure for mounting a glass disc on a spectacle frame comprising a countersunk portion in said frame having a round central opening therethrough, a glass disc adapted for insertion within the confines of said countersunk portion, a retaining clip of resilient material permanently mounted on said spectacle frame in a position directly adjacent to said spectacle frame countersunk position, said retaining clip having a base portion and two arcuate shaped arm portions extending from opposite sides of said base portion for said glass disc, said base portion being bent to form a support and mounting bracket for said arm portions, the bend being of such an angle as to cause said arm portions to be biased toward said spectacle frame and towards each other, each arm portion being provided at its free end with a pair of lugs disposed at right angles to each other, one of said lugs on each arm acting to press said glass disc toward said spectacle frame and the other of said lugs on each arm acting to first guide said glass disc into said countersunk portion and then entering said countersunk portion to lock said glass disc in its position in said countersunk portion in said spectacle frame, said retaining clip permitting insertion and removal of said glass disc in opposition to said two way spring bias.

3. In combination, a light signal spectacle having a countersunk portion with a round central opening therethrough, a metallic framed glass disc adapted for insertion within the confines of said countersunk portion of said spectacle, a retaining clip of resilient material for holding said glass disc in position when confined within said countersunk portion, said retaining clip being of substantial horseshoe shape and provided with an angle bracket portion shaped to facilitate mounting on said spectacle and also causing said retaining clip to be spring biased toward said spectacle, said retaining clip having two arcuate shaped arm portions extending from opposite sides of said angle bracket portion, said arm portions being spring biased towards each other and each being provided at their free ends with a pair of lugs disposed at right angles to each other, whereby the two way spring bias of said retaining clip in its mounted position permits insertion and removal of said glass disc and also provides a means for holding said glass disc in position in said countersunk portion of said spectacle.

4. In a structure for mounting a glass disc on a light signal spectacle, a spectacle frame having an opening therein, a single resilient retaining clip having a base portion and two spaced arms extending away from said base portion, said base portion being attached to said frame adjacent said opening and providing a fixed support for one side of said glass disc, each of said arms having a pair of angularly disposed fingers at their ends for grasping another side of said glass disc, whereby said glass disc is firmly held at one point and yieldably held at two other spaced points.

5. In a structure for mounting a glass disc on a light signal spectacle, a spectacle frame having an opening therein, a single resilient retaining clip having a base portion and two spaced arms extending away from said base portion, said base portion attached to said spectacle frame adjacent said opening and providing a fixed support for one side of said glass disc, said arms extending around said opening and having fingers at their ends for grasping said glass disc at spaced points, and at least one finger on each arm being received by said spectacle frame for locking that arm against movement in a plane parallel with said spectacle frame, whereby said glass disc is firmly held at one point and is yieldably held at two spaced points only with regard to a particular direction substantially perpendicular to the plane of said spectacle frame.

6. A structure for mounting a glass disc on a spectacle frame comprising a spectacle frame with a recessed flanged opening located therein, a glass disc inserted in said recess of said spectacle frame, a retaining clip of resilient material having a bent base portion and two extending arm portions, said bent base portion providing a mounting means therefor and a fixed support at one side of said recess for holding said glass disc in its normal position and at times biasing said arm portions toward said spectacle frame, said arm portions extending from opposite sides of said base portion, each of said arms having two extending fingers transversely disposed to each other, said two arms biased towards each other to permit said fingers to grasp said glass disc when inserted, one finger on each of said arms pressing said glass disc inwardly toward said spectacle frame into said recess, the other of said fingers engaging the sides of said glass disc and said recess to hold said glass disc in its normal position in said recess, said two fingers cooperating with said recess to prevent movement against the bias of each of said arms, said glass disc being removable only after a first movement against said inward bias of said arm.

References Cited in the file of this patent

UNITED STATES PATENTS

| | | |
|---|---|---|
| 337,202 | Seymour | Mar. 2, 1886 |
| 1,104,706 | Ramsey | July 21, 1914 |
| 1,363,537 | Scott | Dec. 28, 1920 |
| 2,111,650 | Wells et al. | Mar. 22, 1938 |